United States Patent [19]

Ponthieu et al.

[11] Patent Number: 5,387,560
[45] Date of Patent: Feb. 7, 1995

[54] GLASSES FOR SUBSTRATES INTENDED FOR ELECTRONICS AND RESULTANT PRODUCTS

[75] Inventors: Christine Ponthieu; Denis Petitmaire, both of Paris; Didier Jousse, Saint-Leu La Foret; Pascal Fournier, Senlis, all of France

[73] Assignee: Saint Gobain Vitrage International, Courbevoie, France

[21] Appl. No.: 210,091

[22] Filed: Mar. 17, 1994

Related U.S. Application Data

[63] Continuation of Ser. No. 908,281, Jul. 2, 1992, abandoned.

[30] Foreign Application Priority Data

Jul. 2, 1991 [FR] France .................. 91 08201

[51] Int. Cl.⁶ ................ C03C 3/091; C03C 4/16
[52] U.S. Cl. ........................... 501/66; 501/59
[58] Field of Search .................. 501/59, 66, 70

[56] References Cited

U.S. PATENT DOCUMENTS

| | | |
|---|---|---|
| 4,166,747 | 9/1979 | Neely, Jr. |
| 4,665,039 | 5/1987 | Kokubu et al. ............... 501/59 X |
| 4,749,665 | 6/1988 | Yano et al. ................... 501/70 X |
| 4,824,808 | 4/1989 | Dumbaugh, Jr. ............... 501/66 |

FOREIGN PATENT DOCUMENTS

| | | |
|---|---|---|
| 0316089 | 5/1989 | European Pat. Off. |
| 0122748 | 7/1985 | Japan ................... 501/66 |
| WO89/02877 | 4/1989 | WIPO. |

*Primary Examiner*—Karl Group
*Attorney, Agent, or Firm*—Pennie & Edmonds

[57] ABSTRACT

This invention relates to glass compositions intended for forming a substrate used in the production of electronic equipment. The glasses according to this invention comprise the following constituents within the limits expressed below in cation percentages:

| | |
|---|---|
| $SiO_2 + B_2O_3$ | 57 to 67% |
| with $B_2O_3$ | 5 to 20% |
| $Al_2O_3$ | 14 to 18% |
| $RO (CaO + MgO + BaO + SrO)$ where $CaO/Ro \geq 0.7$ and $CaO \geq 18\%$ | 18 to 25% |
| $Na_2O + K_2O$ | 0 to 0.5% |
| $TiO_2$ | 0 to 2.5% |
| $Fe_2O_3$ | $\leq 0.5\%$ |
| $F_2$ | 0 to 3% |

$F_2$ being regarded as a cation.

7 Claims, No Drawings

GLASSES FOR SUBSTRATES INTENDED FOR ELECTRONICS AND RESULTANT PRODUCTS

This is a continuation of application Ser. No. 07/908,281, filed Jul. 2, 1992, now abandoned.

FIELD OF THE INVENTION

The present invention concerns glass compositions that are capable of being converted into sheets which, when cut to the desired format, are intended for use as substrates, on which thin film transistors will be formed, or which will be used for the manufacture of screens such as liquid crystal screens.

BACKGROUND OF THE INVENTION

The glasses already known in this field of use are numerous and mostly belong to the large family of the aluminoborosilicate glasses, which include the alkaline earth oxide glasses.

These glasses are chosen according to the physico-chemical properties which the substrate should possess. In fact, where the glass substrate has on its surface a network of thin film transistors, this film is obtained after several operations, during which the glass has been subjected to relatively high temperatures. The glass must not deform during these operations and should therefore have the highest possible strain point. Furthermore, the coefficient of thermal expansion of the glass forming the substrate must be compatible with that of the films which are deposited on its surface. Finally, the glass must virtually contain no elements that are likely to migrate into the films formed and to cause the network properties of the transistors to deteriorate; this is the case, in particular, for the alkalines.

These glasses also should have viscosity and devitrification characteristics that are adapted to the process chosen for producing a glass sheet, the thickness and the surface of which shall be as uniform as possible.

These glasses must also have good chemical resistance with respect to acid media, notably with respect to solutions based upon hydrofluoric acid.

One of the processes that may be used consists of bringing the molten glass into a device, the top of the side walls of which, converging downwards, act as a spillway. The glass flows along the side walls, thus forming two currents which join at the apex of the device, before being drawn vertically downwards in the form of a plane sheet. Such a process requires that the glass shall have, at the liquidus temperature, a viscosity equal to at least 2 to $3 \times 10^5$ poises. Such glasses are, for example, illustrated in the patent U.S. Pat. No. 4,824,808.

Another process consists of spreading the molten glass over a bath of molten tin in accordance with the well known float glass technique. Glass compositions that are capable of being floated and intended for use as substrates for forming flat screens are described, notably, in patent application Ser No. WO 89/02877.

These glasses belong to the family of the alumino-borosilicates, having a high content of alkaline earth oxides. Whereas these glasses possess good pbysico-chemical characteristics having regard to the application under consideration, their composition contains a high percentage of expensive oxides, such as $B_2O_3$, SrO and BaO. Furthermore, they are fairly viscous for the float glass process, if judged from the examples illustrating that invention. In fact, the temperature corresponding to $\log \eta = 4$ is equal to or greater than $1,150°$ C., even higher than $1,200°$ C. It may be remembered that the temperature corresponding to the same viscosity for an ordinary float glass (silico-sodo-calcic glass) lies between $1,000°$ and $1,050°$ C.

SUMMARY OF THE INVENTION

The invention has as its subject glass compositions suitable for being floated, which possess the physico-chemical characteristics required for the substrates of active matrix screens and which are interesting from the economical aspect.

The invention has as its subject, notably, glass compositions which spread over the surface of the tin bath at a temperature lower than that of the known glasses for this type of application.

The invention also has as its subject glass compositions containing a limited quantity of expensive constituents.

DETAILED DESCRIPTION OF THE INVENTION

These objectives are achieved by glass compositions that contain no zinc oxide, which comprise the following constituents, within the limits given below, expressed as cation percentages:

| | |
| --- | --- |
| $SiO_2 + B_2O_3$ | 57 to 67% |
| with $B_2O_3$ | 5 to 20% |
| $Al_2O_3$ | 14 to 18% |
| RO (CaO + MgO + BaO + SrO) where CaO/RO $\geq$ 0.7 and CaO $\geq$ 18% | 18 to 28% |
| $F_2$ | 0 to 3% |
| $Na_2O + K_2O$ | 0 to 0.5% |
| $TiO_2$ | 0 to 2.5% |
| $Fe_2O_3$ | $\leq 0.5\%$ |

$F_2$ being regarded as a cation.

$F_2$ being regarded as a cation.

The glass compositions according to this invention are without zinc oxide since, in those glasses which contain it, this oxide is partly reduced on contact with the molten tin bath and the reducing atmosphere which exists above this bath. The surface composition of the glass band or ribbon is then notably different from that of the underlying glass, which results in defects of planeity of said band.

$SiO_2$ and $B_2O_3$ are the two principal oxides which form the vitreous network of the glasses according to this invention and which are essential for their stability.

Where the sum of these two oxides is less than 57%, a decrease is observed in the chemical resistance of the glass and also an aggravation of the devitrification phenomenon linked to the presence of a too high quantity of the other constituents of the compositions according to this invention.

Where the sum of these two oxides exceeds 67% and the $B_2O_3$ content is low, the melting of the glass becomes difficult, its viscosity increases notably and the devitrification in the form of crystalline types based upon silica rapidly increases.

In this context, the $B_2O_3$ content should not be less than 5% in order to keep the devitrification within acceptable limits. Furthermore, this oxide is necessary for improving the chemical resistance of the glass, notably with respect to hydrofluoric acid, for facilitating its melting and for reducing its viscosity and also its coefficient of expansion. Above 20%, $B_2O_3$ does not contribute further to the improvement of the chemical resistance of the glasses according to this invention and lowers the strain point. Moreover, a higher content of this oxide increases the cost of the vitrifiable mixture and accentuates the problems of evaporation of material during melting, which adversely affects the homogeneity of the glass.

More specifically, the glass compositions according to this invention comprise, preferably, from 42 to 53% of $SiO_2$.

$Al_2O_3$ also fulfils a stabilizing role in the compositions of this invention. It raises the strain point and, to a certain extent, increases the chemical resistance of the glasses. An $Al_2O_3$ content less than approximately 14% or higher than approximately 18% causes an increase in the devitrification.

The alkaline earth oxides also fulfil a very important role in the glasses according to this invention: they favour the melting of the glasses and decrease their viscosity.

Among these oxides, CaO fulfils a special role. CaO enables the melting of the glass to be made easier, and at the same time enables its viscosity and liquidus temperature to be reduced. This oxide also allows the strain point to be raised without excessively increasing the coefficient of expansion.

In order to obtain these effects in the glasses according to this invention, the cation percentages of CaO should be at least 18%. Moreover, the cation percentage of CaO represents at least 70% of the sum of the cation percentages of the totality of the alkaline earth oxides introduced into the glass, this sum ranging from 18 to 25%.

When this sum is less than 18%, the reduction in the viscosity of the glass at high temperatures is insufficient. When this sum is greater than 25%, the tendency to devitrification considerably increases, the coefficient of expansion increases also and this occurs all the more rapidly as the content of BaO and SrO rises.

More precisely, the glass compositions according to this invention contain from 0 to 5% MgO, from 0 to 4% BaO and from 0 to 4% SrO.

The introduction of MgO enables the viscosity of the glass and its coefficient of expansion to be reduced and its chemical resistance to be increased. Above 5%, the devitrification of the glass accelerates and occurs at too high temperatures.

The introduction of BaO and/or of SrO promotes the reduction of the viscosity of the glass at high temperatures; these oxides also enable the devitrification risk to be reduced. When they are introduced into the glasses according to this invention in a fairly large quantity, the coefficient of thermal expansion increases.

In order to avoid the phenomenon of migration of elements into the film covering the surface of a substrate, the glasses of this invention contain very little, indeed no alkaline oxides. The maximum content of these oxides is approximately 0.5%, expressed as cation percentage.

The glasses according to this invention may also contain other constituents, such as $TiO_2$ which improves the chemical resistance of the glass, fluorine which facilitates the melting of the glass, decreases its viscosity and increases its chemical resistance when it is substituted for lime, and also iron oxide. The total iron, expressed in the form of $Fe_2O_3$, remains less than approximately 0.5%, expressed as a cation percentage.

The preferred glass compositions, according to this invention, contain the following constituents, within the limits shown below, expressed as cation percentages:

| | |
|---|---|
| $SiO_2$ | 42 to 53% |
| $B_2O_3$ | 5 to 20% |
| $Al_2O_3$ | 14 to 18% |
| CaO | 18 to 22% |
| MgO | 0 to 5% |
| BaO | 0 to 4% |
| SrO | 0 to 4% |
| $Na_2O + K_2O$ | 0 to 0.5% |
| $TiO_2$ | 0 to 2.5% |
| $Fe_2O_3$ | $\leq 0.5\%$ |
| $F_2$ | 0 to 3% | the sum of $SiO_2$ and $B_2O_3$ still remaining between 57 and 67%; the sum of the alkaline earth oxides (RO) remaining between 18 and 25% with CaO/RO $\geq 0.7$.

In order to keep the cost of the glass compositions according to this invention to a minimum, without adversely affecting the physico-chemical characteristics which they must have for the application envisaged, the sum of the percentages of the oxides of barium and strontium is, preferably, equal to or less than 6%.

With the objective of preventing any migration of elements into the films deposited on the surface of the substrate, formed of a glass sheet having the composition defined above, the glasses according to this invention have a percentage of $Na_2O$ which is, preferably, less than approximately 0.2%.

The advantages offered by the glasses according to this invention will be better understood from the examples that appear in the attached table.

The thermal characteristics, devitrification and viscosity of the glasses illustrating the invention were measured by the methods well known to the person skilled in the art. Their chemical resistance was assessed by measuring the loss of weight undergone by a glass plate specimen of $15 \times 30 \times 6$ millimeters, polished on both faces, after a dwell in an acid solution. This loss is expressed in $mg/cm^2$. The resistance to hydrofluoric acid ($R_{HF}$) is measured after a dwell of 7 hours at ambient temperature in an aqueous solution of hydrofluoric acid and ammonium fluoride. This attack solution is made up from a 50% solution of hydrofluoric acid and a 40% solution of ammonium fluoride, mixed in a ratio by weight of 1 to 7.

The glasses according to this invention are prepared from vitrifiable raw materials, some of which are natural and which should have the least impurities possible.

Thus the vitrifiable mixture used for obtaining 100 g of the glass corresponding to Example No. 1 is as follows:

| | |
|---|---|
| Roncevaux sand | 55.327 g |
| Hydrated alumina (Prolabo) | 21.760 g |
| Saint-Germain limestone | 37.712 g |
| Magnesium carbonate | 0.782 g |
| Boric acid | 15.793 g |
| Gypsum | 0.295 g |

In this example, calcium sulphate was used as refining agent. Other materials may be used for fulfilling this function in the production of the glasses of this invention, such as calcium chloride and barium chloride, ammonium sulphate or arsenious anhydride.

The glasses according to this invention generally have strain points higher than 630° C., coefficients of thermal expansion lower than approximately $55 \times 10^{-7}/°$ C. and good resistance to hydrofluoric attack.

Furthermore, the glasses of this invention are distinguished by a considerable reduction in their viscosity at high temperatures. In fact, the temperature at log $\eta=3.5$ is generally less than 1,180° C.; that corresponding to log $\eta=4$ for these glasses is generally less than 1,120° C. These various characteristics enable the glasses of this invention to be easily spread over the surface of a molten tin bath and thus to obtain, by the float glass technique, a glass ribbon the thickness of which is strictly controlled. From such a ribbon, glasses which may be used as substrates are produced by cutting out.

The glasses of this invention are also distinguished by a very low maximum devitrification rate. This characteristic enables any risk of devitrification of the glass during its shaping to be ignored, in spite of a liquidus temperature that may reach 1,230° C.

The glasses of this invention ,nay be used as substrates, on which are deposited various basic films or coatings, notably of Si, SiOx, indium and tin oxides (ITO) or aluminium, for the purpose of producing a fine thin film transistor network (TFT).

The glasses according to this invention may also be used for the construction of coloured filters. The glass is, for example, covered with a film of Cr or NiCr, which is then engraved by photolithography. A pavement of colours (red, green, blue) is then created by deposition of colours and photolithography. The whole is then covered with a film of polylmide, and then ITO.

TABLE

|  | Ex. 1 | Ex. 2 | Ex. 3 | Ex. 4 |
| --- | --- | --- | --- | --- |
| SiO₂ | 50.82 | 50.55 | 46.63 | 50.38 |
| Al₂O₃ | 14.61 | 14.14 | 14.30 | 14.37 |
| CaO | 20.22 | 19.16 | 20.02 | 19.89 |
| MgO | 0.47 | 0.47 | 0.46 | 0.47 |
| B₂O₃ | 13.75 | 15.59 | 18.50 | 13.67 |
| Fe₂O₃ | 0.02 | 0.02 | 0.02 | 0.02 |
| TiO₂ | 0.01 | 0.01 | 0.01 | 0.16 |
| Na₂O | 0.07 | 0.03 | 0.03 | — |
| K₂O | — | — | — | — |
| SO₃ | 0.03 | 0.02 | 0.02 | 0.03 |
| Strain point (°C.) | 659 | 652 | 647 | 661 |
| Coefficient of expansion ($10^{-7}/°$C.) | 50.5 | 53 | 47.6 | 50.5 |
| Liquidus (°C.) | 1190 | 1200 | 1200 | 1200 |
| Temp. of max. devitrification rate (°C.) | 1075 | 1050 | 1075 | 1075 |
| Max. devitrification rate (μm/min) | 0.17 | 0.25 | 0.17 | 0.25 |
| Temp. log $\eta$ = 3.5 (°C.) | 1148 | 1149 | 1125 | 1144 |
| Temp. log $\eta$ = 4 (°C.) | 1095 | 1092 | 1068 | 1088 |
| R$_{HF}$ (mg/cm²) | 9.35 | 8.87 | 9.84 | — |

|  | Ex. 5 | Ex. 6* | Ex. 7* | Ex. 8 |
| --- | --- | --- | --- | --- |
| SiO₂ | 53.07 | 51.00 | 51.00 | 52.22 |
| Al₂O₃ | 14.52 | 15.20 | 15.20 | 14.41 |
| CaO | 18.96 | 18.30 | 18.30 | 18.35 |
| MgO | 2.98 | 3.00 | 3.00 | 4.74 |
| SrO |  | 2.00 |  |  |
| BaO |  |  | 2.00 |  |
| B₂O₃ | 10.40 | 10.50 | 10.50 | 10.20 |
| Fe₂O₃ |  |  |  |  |
| TiO₂ |  |  |  |  |
| Na₂O | 0.05 |  |  | 0.04 |
| K₂O |  |  |  |  |
| F₂ |  |  |  |  |
| SO₃ | 0.02 |  |  | 0.02 |
| Strain Point (°C.) | 653 | 655 |  | 655 |
| Coefficient of expansion ($10^{-7}/°$C.) | 53.7 | 53.6 | 55.2 | 53.2 |
| Liquidus (°C.) | 1200 | 1180 | 1170 | 1230 |
| Temp. of max devitrification rate (°C.) | 1060 |  |  | 1140 |
| Max. devitrification rate (μm/min) | 0.22 |  |  | 0.51 |
| Temp. log $\eta$ = 3.5 (°C.) | 1152 | 1163 | 1158 | 1164 |
| Temp. log $\eta$ = 4 (°C.) | 1099 | 1107 | 1102 | 1108 |
| R$_{HF}$ (mg/cm²) | 10.84 | 12.13 | 12.36 | 10.76 |

|  | Ex. 9 | Ex. 10* | Ex. 11 |
| --- | --- | --- | --- |
| SiO₂ | 51.03 | 51.00 | 52.67 |
| Al₂O₃ | 14.65 | 15.20 | 14.20 |
| CaO | 19.44 | 19.30 | 18.55 |
| MgO | 3.02 | 3.00 | 2.76 |
| SrO |  |  |  |
| BaO |  |  |  |
| B₂O₃ | 9.78 | 10.50 | 9.55 |
| Fe₂O₃ |  |  |  |
| TiO₂ | 1.97 |  |  |
| Na₂O | 0.06 |  | 0.10 |
| K₂O |  |  |  |
| F₂ |  | 1.00 | 2.13 |
| SO₃ | 0.03 |  | 0.03 |
| Strain Point (°C.) | 656 | 646 | 634 |
| Coefficient of expansion ($10^{-7}/°$C.) | 53.5 | 53.4 | 51.70 |
| Liquidus (°C.) | 1210 | 1200 | 1210 |
| Temp. of max devitrification rate (°C.) | 1120 |  |  |
| Max. devitrification rate (μm/min) | 0.41 |  |  |
| Temp. log $\eta$ = 3.5 (°C.) | 1160 | 1164 | 1176 |
| Temp. log $\eta$ = 4 (°C.) | 1103 | 1106 | 1115 |
| R$_{HF}$ (mg/cm²) | 9.67 | 13.82 | 9.98 |

*Theoretical composition

We claim:

1. Glass substrate for use in the production of electronic equipment, characterized in that the substrate consists essentially of the following constituents within limits expressed below as cation percentages:

| SiO₂ + B₂O₃ | about 57 to 67% |
| --- | --- |
| with B₂O₃ | about 5 to 20% |
| Al₂O₃ | about 14 to 18% |
| RO (CaO + MgO + BaO + SrO) | about 18 to 25% |
| where CaO/RO ≧ 0.7 and CaO ≧ 18% |  |
| Na₂O + K₂O | about 0 to 0.5% |
| TiO₂ | about 0 to 2.5% |
| Fe₂O₃ | about ≦0.5% |
| F₂ | about 0 to 3% | where F₂ is a cation,
wherein the glass substrate has a strain point greater than 630° C. and a coefficient of thermal expansion lower than about $55 \times 10^{-7}/°$ C.

2. The glass substrate according to claim 1, characterized in that its SiO₂ content, expressed as a cation percentage, is from about 42 to 53%.

3. The glass substrate according to claim 1, characterized in that its content of alkaline earth oxides other than CaO, expressed as a cation percentage, is:

| MgO | about 0 to 5% |
| --- | --- |
| BaO | about 0 to 4% |
| SrO | about 0 to 4%. |

4. The glass substrate according to claim 1, characterized in that said glass substrate consists essentially of the following constituents:

| | |
|---|---|
| SiO₂ | about 42 to 53% |
| B₂O₃ | about 5 to 20% |
| Al₂O₃ | about 14 to 18% |
| CaO | about 18 to 22% |
| MgO | about 0 to 5% |
| BaO | about 0 to 4% |
| SrO | about 0 to 4% |
| Na₂O + K₂O | about 0 to 0.5% |
| TiO₂ | about 0 to 2.5% |
| Fe₂O₃ | about ≦0.5% |
| F₂ | about 0 to 3%. |

5. The glass substrate according to claim 4, characterized in that the sum of the cation percentages of BaO and SrO is equal to or less than 6%.

6. The glass substrate according to any one of claims 4 and 5, characterized in that the cation percentage of Na₂O is less than about 0.2%.

7. The glass substrate of claim 1 wherein the substrate is cut from a band of glass that is formed by spreading a molten glass consisting essentially of said constituents over the surface of a molten tin bath.

* * * * *